(No Model.) 3 Sheets—Sheet 1.
E. J. BONHAM.
RAILROAD PASSENGER TICKET AND BAGGAGE CHECK COMBINED.
No. 575,413. Patented Jan. 19, 1897.
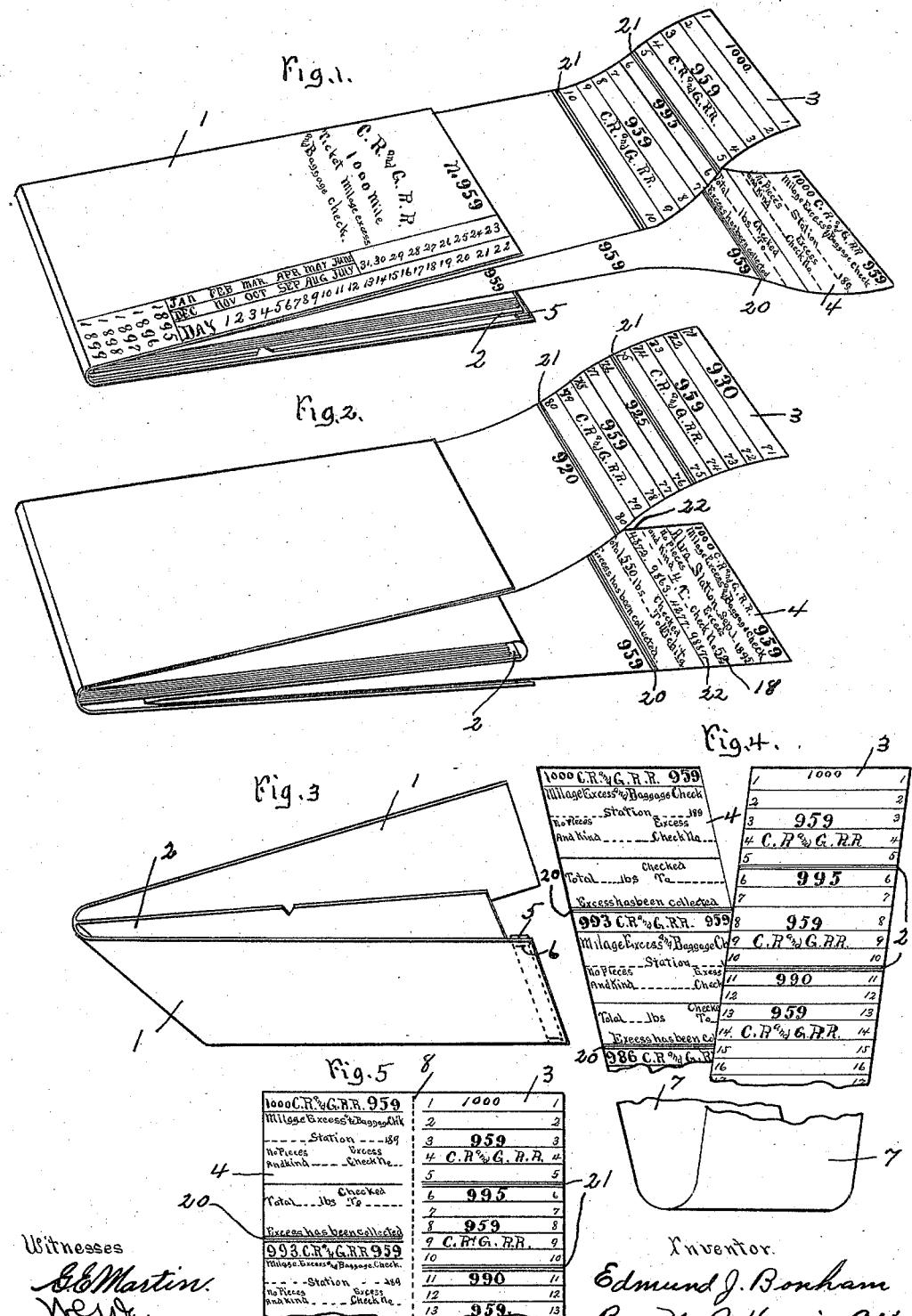

(No Model.) 3 Sheets—Sheet 2.
E. J. BONHAM.
RAILROAD PASSENGER TICKET AND BAGGAGE CHECK COMBINED.
No. 575,413. Patented Jan. 19, 1897.
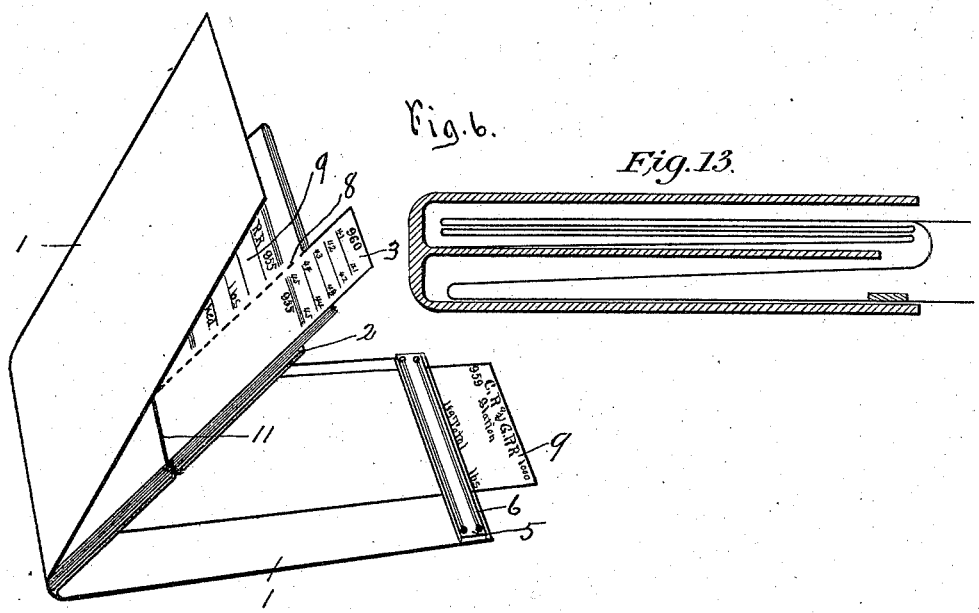
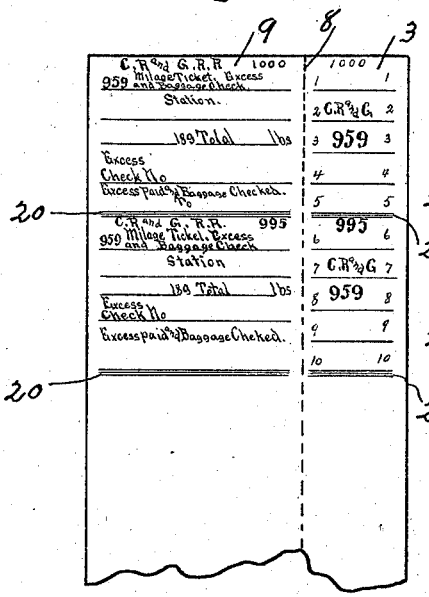
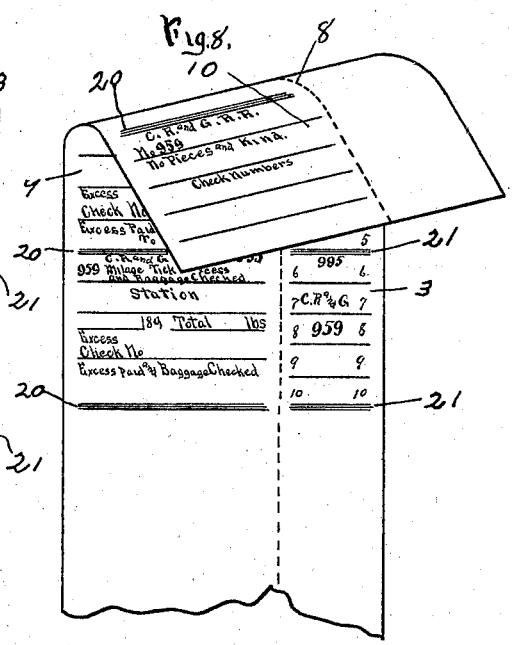
Witnesses
E. E. Martin.
N. G. Dean
Inventor
Edmund J Bonham
By N. B. Hagin atty.

(No Model.)  3 Sheets—Sheet 3.

E. J. BONHAM.
RAILROAD PASSENGER TICKET AND BAGGAGE CHECK COMBINED.

No. 575,413.  Patented Jan. 19, 1897.

Witnesses.
G. E. Martin

Inventor.
Edmund J. Bonham
By N. B. Hagin Atty

UNITED STATES PATENT OFFICE.

EDMUND J. BONHAM, OF WICHITA, KANSAS.

RAILROAD PASSENGER-TICKET AND BAGGAGE-CHECK COMBINED.

SPECIFICATION forming part of Letters Patent No. 575,413, dated January 19, 1897.

Application filed October 7, 1895. Serial No. 564,859. (No model.)

*To all whom it may concern:*

Be it known that I, EDMUND J. BONHAM, a citizen of the United States of America, residing at Wichita, in the county of Sedgwick and State of Kansas, have invented certain new and useful Improvements in a Railroad Passenger-Ticket and Baggage-Check Combined, of which the following is a specification, reference being had therein to the accompanying drawings, and the figures of reference thereon, forming a part of this specification, in which—

Figure 1 is a perspective view of a railroad mileage-ticket with my improved baggage-check attached thereto. Fig. 2 is a like view of the same, showing the baggage-check filled out and turned between the back cover and the partition or middle leaf and a portion of the mileage torn off. Fig. 3 is a perspective view of the mileage-book cover, showing the middle or partition leaf. Fig. 4 is a face view of a mileage-ticket and baggage-check combined printed on one continuous strip of paper. Fig. 5 is a like view of the same printed side by side and adapted to be folded lengthwise of the paper, leaving the printed portion outward. Fig. 6 is a perspective view of a mileage-ticket and baggage-check combined, together with the cover, showing the keeper 5. Figs. 7 and 8 are face views of the ticket shown in Fig. 6, showing part of the baggage-check printed on either side. Fig. 9 is another style of ticket commonly used by railroad companies with my improved baggage-check attached thereto. Fig. 10 is a coupon-ticket, showing a baggage-check attached thereto. Fig. 11 is another style of railway-ticket with a baggage-check attached and provisions for "stop-off" privileges with baggage. Fig. 12 is an ordinary card-ticket with a baggage-check attached thereto. Fig. 13 is a sectional view of the ticket shown in Fig. 6 with the rubber 11 removed.

This invention relates to certain improvements in railroad-tickets and baggage-checks, and a case for a mileage-book; and the object of this invention is to provide a system of checking baggage, so as to prevent people from checking baggage without using their tickets, as is now the case with all railroad-tickets now in use.

Referring to the drawings, 1 represents a case or cover for a mileage-book. Said cover is provided with the center leaf 2, which is for the purpose of separating the baggage-check 4, as shown in Figs. 2 and 6, from the mileage-ticket 3 when the mileage is torn off, leaving a long strip of baggage-checks. Said ticket and baggage-check will be more fully hereinafter described.

5 represents a keeper yieldingly held to the back cover 1 by the rubber band 6, (see Figs. 3 and 6,) and is for the purpose of holding the filled-out baggage-check where it can be readily seen by the conductor taking up the tickets on the train.

7 represents one style of printing a railway-ticket and baggage-check when the mileage-ticket is printed on one end and one side of a long strip of paper and the baggage-check is printed on the opposite end and the opposite side of the same strip of paper.

8 represents perforations between the mileage-tickets and baggage-checks, in which they are printed side by side and may be folded along the line of the perforations, making the printed portion facing out and in opposite directions, or they may be left as shown in Fig. 6.

The tickets shown in Figs. 1, 2, 4, and 5 show the mileage divided in the usual way at each mile, and with heavy lines at each five miles, and each baggage-check is printed in a space about equal in length to seven or eight miles of the mileage-ticket.

In case that some companies may desire to have the mileage-ticket 3 and baggage-checks 9 divided the same at each five miles, as shown in Figs. 6, 7, and 8, the part 10 of said baggage-checks 9 is printed on the back of said baggage-check, as shown in Fig. 8.

11 represents a rubber band around said center leaf 2, and is for the purpose of holding the mileage-ticket and baggage-checks in place on said center leaf 2.

The use of said mileage-ticket and baggage-check will be more fully hereinafter described.

12 represents a railroad passenger-ticket with my baggage-check 4 attached.

13 represents perforations in said ticket, so that said baggage-check may readily be detached at the proper time from the agent's stub 15 and the ticket 12.

14 represents a provision for "stop-off" of baggage at certain named stations. (See Fig. 11.)

16 represents an ordinary card passenger-ticket with my improved baggage-check 4 attached and is provided with the perforations 13, so that said baggage-check may readily be detached.

The best way of using these combined passenger-tickets and baggage-checks is as follows:

When excess baggage is carried by a passenger traveling on a mileage-ticket, the number of the excess-baggage check is entered, as shown at 18 in Fig. 2, the numbers of "brasses" or other checks on other pieces on lines below, as shown at 22, Fig. 2, or on back of check, as shown in Fig. 8; but one baggage-check is to be filled out by the baggageman checking the baggage, as shown in Fig. 2. The baggageman delivering the baggage at destination will detach coupons for the full distance between stations named on checks. (See Fig. 2.) Said coupon-checks must only be detached on heavy-ruled lines 20. If by detaching said checks at said heavy-ruled lines 20 they do not detach even with the heavy-ruled lines 21 on the mileage-ticket, the baggage-check should be detached at first heavy-ruled line above mileage detachment. For example, if mileage is detached at forty-three miles, the baggage-check should be detached at forty miles.

The baggage-check should not be detached and the baggage should not be delivered if mileage has not been detached for full distance between stations named on baggage-check; neither should baggage be checked on detached coupons. If no excess baggage is carried, enter other check-numbers in the same manner as above described. If only used as excess-baggage check, then only excess number is to be entered.

Baggageman checking baggage will in no case detach baggage-coupon check, but will, after filling out said coupon, fold it back in place between front leaf of cover 1 and middle leaf 2 and return ticket to passenger.

When mileage is presented to the conductor and baggage has been checked, mileage should only be detached for his run or for distance for which baggage has been checked, allowing baggage-coupon check to remain attached and folded back in place between the middle leaf 2 and the back leaf of the cover 1, and the end slipped under the keeper 5, as shown in Fig. 6.

If no baggage has been checked, the conductor should detach both mileage and baggage coupon check for his full run or for distance to be traveled.

Railway companies using these tickets and baggage-checks may choose to vary the above-described way of detaching the same and prefer the following way: Conductors when detaching mileage may also detach baggage-coupon check for full distance in same manner as has been described and enter his (the conductor's) name, date, &c., on back to correspond with name, date, &c., on back of mileage, forwarding the same with collections. This would apply to last conductor on run between stations named on baggage-coupon check.

The baggage-check attached to coupon and all other kinds of railroad tickets are to be used in the same way as has been described for the use of mileage-tickets.

More than one baggage-check may be attached to the tickets for the purpose of allowing stop-offs, and baggage rechecked as before, or provisions may be made for stop-offs as shown at 14 in Fig. 11, the names of the stations when stop-off is to be allowed to be written on said check 14.

Having thus described my invention, what I claim as new and useful, and desire to secure by Letters Patent, is as follows:

1. In the herein-described passenger-ticket consisting of mileage-coupons, printed on one side of one end of a long strip of paper, in combination therewith, an excess and baggage check printed on the opposite end, and the opposite side of said long strip of paper.

2. A mileage, excess and baggage check printed on one long strip of paper, in combination therewith a cover provided with a middle leaf substantially as shown and described.

3. A mileage, excess and baggage check printed on one long strip of paper, a cover provided with a middle leaf, and the back lid of said cover having the strip 5, substantially as shown and described.

EDMUND J. BONHAM.

Witnesses:
O. A. KEATH,
L. E. POTTER.